United States Patent
Chou et al.

(10) Patent No.: US 9,900,550 B1
(45) Date of Patent: Feb. 20, 2018

(54) FRAME RATE UP-CONVERSION APPARATUS AND METHOD

(71) Applicant: Novatek Microelectronics Corp., Hsinchu (TW)

(72) Inventors: Cheng-Wei Chou, New Taipei (TW); Hsiao-En Chang, Hsinchu (TW); Chun-Wei Chen, Taipei (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 15/665,435

(22) Filed: Aug. 1, 2017

(51) Int. Cl.
*H04N 7/01* (2006.01)
*G06T 7/246* (2017.01)

(52) U.S. Cl.
CPC ........... *H04N 7/0127* (2013.01); *G06T 7/248* (2017.01); *G06T 2207/10016* (2013.01)

(58) Field of Classification Search
CPC ........ H04N 7/0127; H04N 7/01; H04N 7/014; H04N 7/0145; H04N 7/0135; H04N 7/0155; H04N 7/0157; G06T 7/248; G06T 2207/10016
USPC ....... 348/441, 446, 448, 451, 452, 458, 459, 348/699; 375/240.16
See application file for complete search history.

(56) References Cited

U.S. PATENT DOCUMENTS

| | | | | |
|---|---|---|---|---|
| 5,021,881 A | * | 6/1991 | Avis | H04N 7/014 348/451 |
| 2011/0255004 A1 | * | 10/2011 | Tran | H04N 7/014 348/699 |

* cited by examiner

*Primary Examiner* — Sherrie Hsia
(74) *Attorney, Agent, or Firm* — JCIPRNET (57) ABSTRACT

An frame rate up-conversion (FRC) apparatus and method are provided. The motion vector generating circuit compares a previous original frame with a current original frame to obtain the first motion vectors of the blocks of the current original frame, and compares the current original frame and a posterior original frame to obtain the second motion vectors of the blocks of the current original frame. The motion vector correction circuit checks whether the blocks of the second original frame are located in an occlusion area, and corrects the motion vectors of the blocks in the occlusion area based on the first motion vectors and the second motion vectors of the first original frame, the second original frame and the third original frame. The interpolation frame generating circuit creates at least one interpolation frame between the first original frame and the second original frame based on the corrected motion vectors.

25 Claims, 8 Drawing Sheets

FRAME RATE UP-CONVERSION APPARATUS AND METHOD

BACKGROUND

Field of the Invention

The invention is directed to a video apparatus and more particularly, to an apparatus and a method for frame rate up-conversion (FRC).

Description of Related Art

Figure 1:
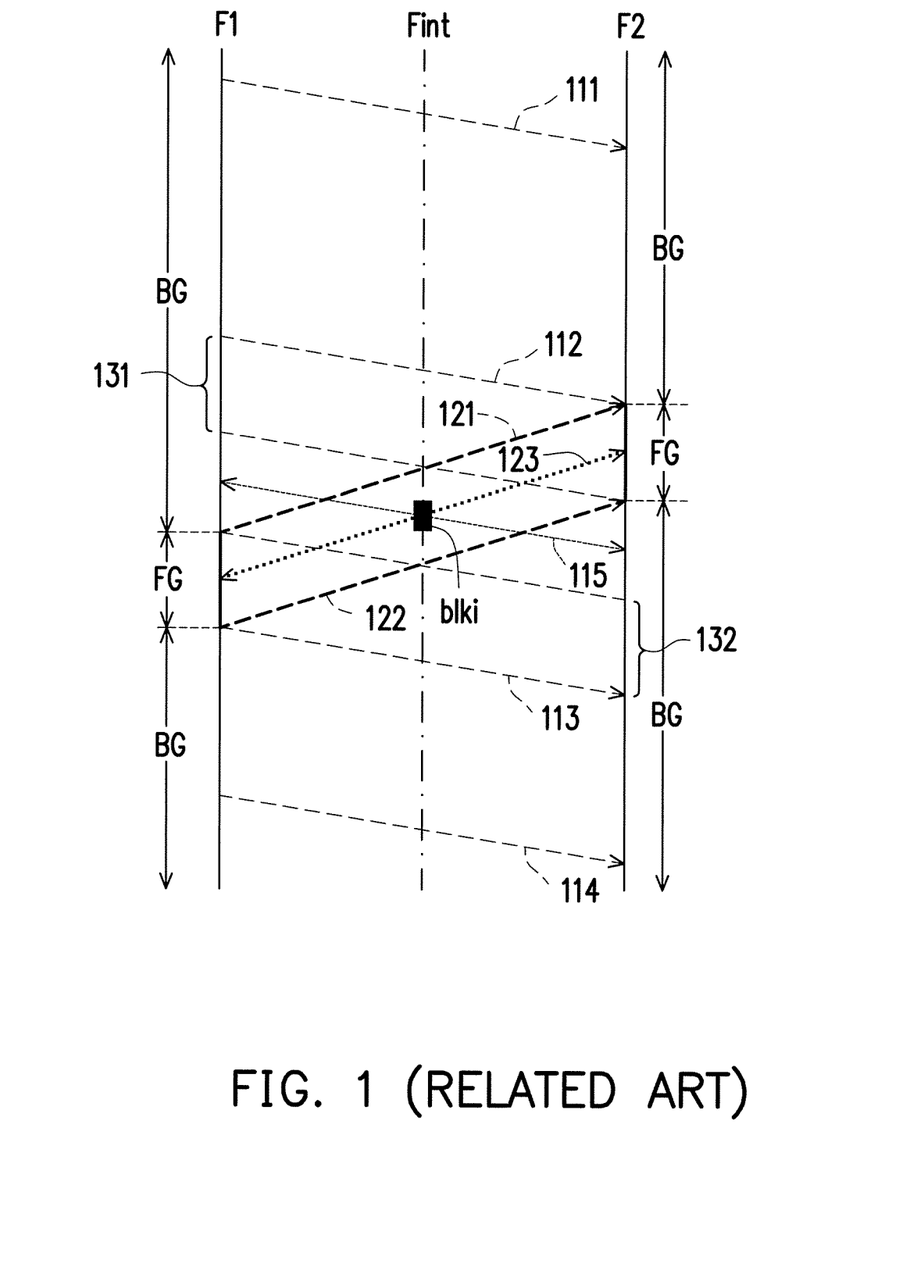
FIG. 1 is a schematic diagram illustrating a frame rate up-conversion (FRC) operation.

A frame rate up-conversion (FRC) operation can facilitate increasing an image display frequency, for example, a display frequency may be increased from 30 frames/second to 60 frames/second. FIG. 1 is a schematic diagram illustrating an FRC operation. The horizontal direction depicted in FIG. 1 may be used to represent time or a display sequence. In the FRC operation, an interpolation frame Fint may be inserted between a first original frame F1 and a second original frame F2. The FRC operation may perform motion estimation (ME). Generally, an image frame may be divided into a plurality of blocks. The ME operation refers to a process for searching for a motion vector (MV) of a block. The motion vector may point out a motion direction and a motion distance of a certain block. The FRC operation may perform the ME operation so as to calculate motion vectors between the first original frame F1 and the second original frame F2. Typically, the FRC operation may perform a three-dimensional recursive search (3DRS) algorithm or other ME algorithms to calculate the motion vectors. After the ME operation is completed, the FRC operation may perform frame interpolation based on the motion vectors so as to create an interpolation frame Fint (or a plurality of interpolation frames Fint) between the first original frame F1 and the second original frame F2.

In the embodiment illustrated in FIG. 1, a background BG of the first original frame F1 moves, with a certain motion vector (e.g., one of background motion vectors 111, 112, 113 and 114 illustrated in FIG. 1), to a new position, namely, a position of the background BG of the second original frame F2 illustrated in FIG. 1. A foreground FG of the first original frame F1 moves, with another motion vector (e.g., one of foreground motion vectors 121 and 122 illustrated in FIG. 1), to a new position, namely, a position of the foreground FG of the second original frame F2 illustrated in FIG. 1. Except for occlusion areas 131 and 132, a similar block (which is a matched block) may be found in the second original frame F2 for any block of the first original frame F1, while a motion vector may represent a motion state of the matched block between the first original frame F1 and the second original frame F2. The occlusion area 131 may be referred to as a covered area. The foreground FG moves with the motion vectors 121 and 122 and so occludes a part of the background, such that no similar block cannot be found in the second original frame F2 for the blocks in the occlusion area 131 of the first original frame F1. The occlusion area 132 may be referred to as a de-covered area. Because the foreground FG of the first original frame F1 moves to the foreground FG of the second original frame F2, no similar block can be found in the first original frame F1 for the blocks in the occlusion area 132 of the second original frame F2.

When the frame interpolation is performed, a de-halo algorithm is generally performed in order to solve the issue that "no similar block can be found in the second original frame F2 for the blocks in the occlusion area 131" and the issue that "no similar block can be found in the first original frame F1 for the blocks in the occlusion area 132". Accordingly, it can be considered that after the ME operation is performed, the motion vectors of the blocks in the occlusion areas 131 and 132 are usually unstable (incorrect). The de-halo algorithm is performed for detecting the occlusion areas 131 and 132 in the condition that the motion vectors are unstable, and thus, the detection result of the de-halo algorithm is not satisfactory.

Furthermore, in some conditions, a plurality of best vectors may be calculated for some blocks of the interpolation frame Fint by the 3DRS motion estimation algorithm. Such issue that a block has a plurality of best vectors is referred to as a multi-match issue or a temporal aperture issue. For example, FIG. 1 illustrates a block blki of the interpolation frame Fint. The block blki is one of the blocks of the foreground FG, and thus, a best vector 123 (which is a foreground motion vector) may be found for the block blki. However, another best vector 115 (which is a background motion vector) may be found for the block blki by the 3DRS algorithm. Therefore, a sum of absolute difference (SAD) value calculated based on the motion vector 115 is small. Both the motion vectors 123 and 115 are the best vectors of the block blki. If the motion vector 115 is mistakenly selected as the motion vector of the block blki, an issue of data broken may occur to the foreground area of the interpolation frame Fint.

SUMMARY

The invention provides an apparatus and a method for frame rate up-conversion (FRC) for detecting an occlusion area and correcting the motion vectors of the blocks in the occlusion area.

According to an embodiment of the invention, an FRC apparatus is provided. The FRC apparatus includes a motion vector generating circuit, a motion vector correction circuit and an interpolation frame generating circuit. The motion vector generating circuit is configured to compare a previous original frame with a current original frame to obtain first motion vectors of a plurality of blocks of the current original frame and compare the current original frame with a posterior original frame to obtain second motion vectors of the blocks of the current original frame. The motion vector correction circuit is coupled to the motion vector generating circuit to receive the first motion vectors and the second motion vectors of a first original frame, a second original frame and a third original frame. The motion vector correction circuit is configured to check whether the blocks of the second original frame are located in an occlusion area and correct the motion vectors of the blocks in the occlusion area based on the first motion vectors and the second motion vectors of the first original frame, the second original frame and the third original frame. The interpolation frame generating circuit is coupled to the motion vector correction circuit to receive the corrected motion vectors of the blocks of the first original frame and the second original frame. The interpolation frame generating circuit is configured to create at least one interpolation frame between the first original frame and the second original frame based on the corrected motion vectors.

According to an embodiment of the invention, an FRC method is provided. The FRC method includes: comparing a previous original frame with a current original frame to obtain first motion vectors of a plurality of blocks of the current original frame; comparing the current original frame with a posterior original frame to obtain second motion vectors of the blocks of the current original frame; based on the first motion vectors and the second motion vectors of a first original frame, a second original frame and a third original frame, checking whether the blocks of the second original frame are located in an occlusion area and correcting the motion vectors of the blocks in the occlusion area to obtain corrected motion vectors of the blocks of the first original frame and the second original frame; and creating at least one interpolation frame between the first original frame and the second original frame based on the corrected motion vectors.

According to an embodiment of the invention, an FRC apparatus is provided. The FRC apparatus includes a motion vector generating circuit, a motion vector correction circuit and an interpolation frame generating circuit. The motion vector generating circuit is configured to compare a previous original frame with a current original frame to obtain first motion vectors of a plurality of blocks of the current original frame and compare the current original frame with a posterior original frame to obtain second motion vectors of the blocks of the current original frame. The motion vector correction circuit is coupled to the motion vector generating circuit to receive the first motion vectors and the second motion vectors of a first original frame, a second original frame and a third original frame. When a current block of an interpolation frame between the first original frame and the second original frame encounters multi-match and has a plurality of projection motion vectors, the motion vector correction circuit selects a foreground block motion vector from the projection motion vectors as a corrected motion vector of the current block of the interpolation frame based on the first motion vectors and the second motion vectors of the first original frame, the second original frame and the third original frame. The interpolation frame generating circuit is coupled to the motion vector correction circuit to receive corrected motion vectors of the blocks of the interpolation frame. The interpolation frame generating circuit is configured to create the interpolation frame between the first original frame and the second original frame based on the corrected motion vectors.

According to an embodiment of the invention, an FRC method is provided. The FRC method includes: comparing a previous original frame with a current original frame to obtain first motion vectors of a plurality of blocks of the current original frame; comparing the current original frame with a posterior original frame to obtain second motion vectors of the blocks of the current original frame; based on the first motion vectors and the second motion vectors of a first original frame, a second original frame and a third original frame, when a current block of an interpolation frame between the first original frame and the second original frame encounters multi-match and has a plurality of projection motion vectors, selecting a foreground block motion vector from the projection motion vectors as a corrected motion vector of the current block of the interpolation frame to obtain corrected motion vectors of the blocks of the interpolation frame; and creating the interpolation frame between the first original frame and the second original frame based on the corrected motion vectors.

To sum up, in the FRC apparatus and the FRC method provided by the embodiments of the invention, based on the motion vectors of the first original frame, the second original frame and the third original frame, the blocks in the occlusion area can be effectively detected, and the motion vectors of the blocks in the occlusion area can be corrected.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

A term "couple" used in the full text of the disclosure (including the claims) refers to any direct and indirect connections. For instance, if a first device is described to be coupled to a second device, it is interpreted as that the first device is directly coupled to the second device, or the first device is indirectly coupled to the second device through other devices or connection means. Moreover, wherever possible, components/members/steps using the same referral numerals in the drawings and description refer to the same or like parts. Components/members/steps using the same referral numerals or using the same terms in different embodiments may cross-refer related descriptions.

Figure 2:
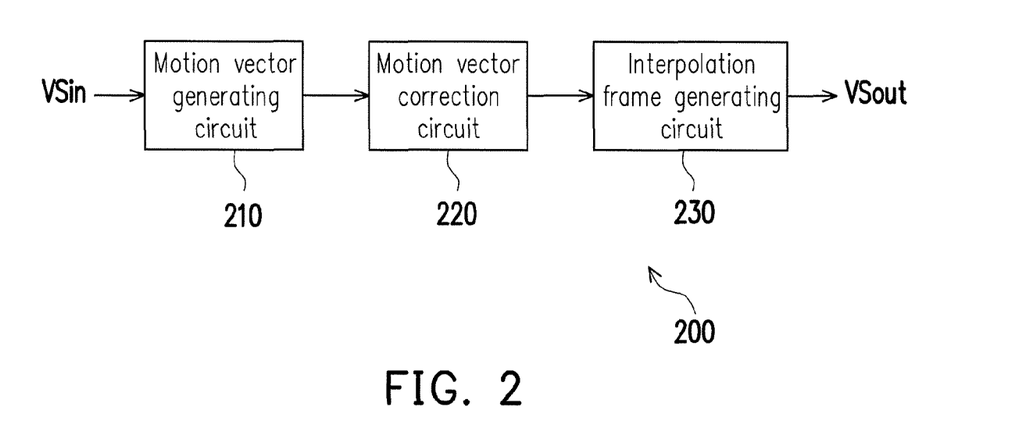
FIG. 2 is a schematic circuit block diagram illustrating an FRC apparatus according to an embodiment of the invention.

FIG. 2 is a schematic circuit block diagram illustrating a frame rate up-conversion (FRC) apparatus 200 according to an embodiment of the invention. The FRC apparatus 200 includes a motion vector generating circuit 210, a motion vector correction circuit 220 and an interpolation frame generating circuit 230. According to a design demand, in some other embodiments, the motion vector generating circuit 210, the motion vector correction circuit 220 and/or the interpolation frame generating circuit 230 may be implemented in a form of firmware or software. For example, related functions of the motion vector generating circuit 210, the motion vector correction circuit 220 and/or the interpolation frame generating circuit 230 may be implemented by firmware codes (or software codes). The firmware codes (or software codes) may be stored in a memory and operated by a processor, a microcontroller or any other computation platform.

Figure 3:
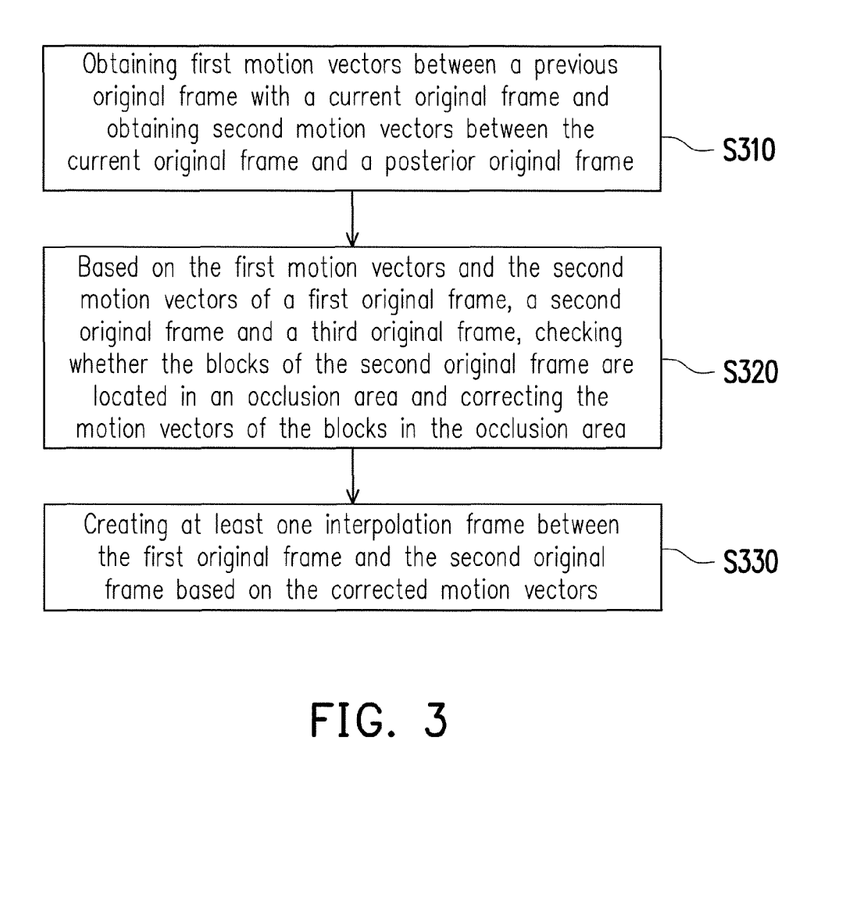
FIG. 3 is a flowchart illustrating an FRC method according to an embodiment of the invention.

FIG. 3 is a flowchart illustrating an FRC method according to an embodiment of the invention. Refer to FIG. 2 and FIG. 3. The motion vector generating circuit 210 receives a video sequence VSin. The video sequence VSin has a plurality of video frames, which are referred to herein as original frames. The motion vector generating circuit 210, in step S310, may compare a previous original frame of the video sequence VSin with a current original frame of the video sequence VSin to obtain first motion vectors of a plurality of blocks of the current original frame, i.e., first motion vectors between the previous original frame and the current original frame. The motion vector generating circuit 210, in step S310, may also compare the current original frame of the video sequence VSin with a posterior original frame of the video sequence VSin to obtain second motion vectors of the blocks of the current original frame, i.e., second motion vectors between the current original frame and the posterior original frame. According to a design demand, the motion vector generating circuit 210 may obtain the first motion vectors and the second motion vectors by using any motion estimation (ME) algorithm (e.g., a conventional three-dimensional recursive search (3DRS) algorithm or any other ME algorithm).

Figure 4:
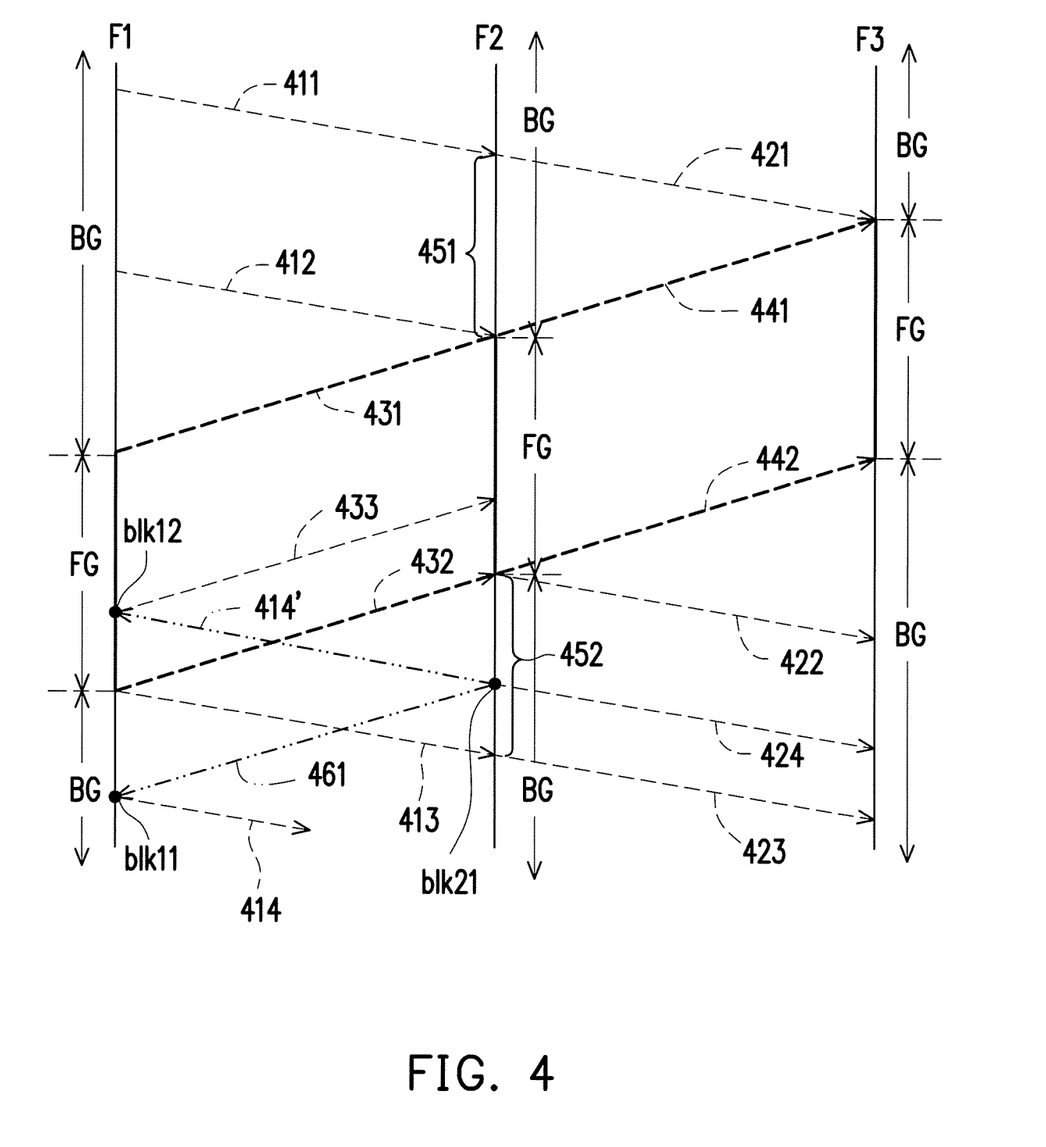
FIG. 4 is a schematic illustrating an operation scenario of step S320 depicted in FIG. 3 according to an embodiment of the invention.

FIG. 4 is a schematic illustrating an operation scenario of step S320 depicted in FIG. 3 according to an embodiment of the invention. The horizontal direction depicted in FIG. 4 may be used to represent time or a display sequence. Refer to FIG. 2 to FIG. 4. The motion vector generating circuit 210, in step S310, may compare a first original frame F1 with a second original frame F2 to obtain first motion vectors of a plurality of blocks of the second original frame F2. The motion vector generating circuit 210, in step S310, may further compare the second original frame F2 with a third original frame F3 to obtain second motion vectors of the blocks of the second original frame F2. The motion vector correction circuit 220 is coupled to the motion vector generating circuit 210 to receive the first motion vectors and the second motion vectors of the first original frame F1, the second original frame F2 and the third original frame F3. Based on the first motion vectors and the second motion vectors of the first original frame F1, the second original frame F2 and the third original frame F3, the motion vector correction circuit 220, in step S320, may check whether the blocks of the second original frame F2 are located in an occlusion area and correct the motion vectors of the blocks in the occlusion area.

In the embodiment illustrated in FIG. 4, any one of the blocks in a background BG of the first original frame F1 moves, with a background motion vector (e.g., one of background motion vectors 411, 412, 413 and 414 illustrated in FIG. 4), to a new position, namely, a position of a background BG of the second original frame F2 illustrated in FIG. 4. The background BG of the second original frame F2 illustrated in FIG. 4 moves, with a background motion vector (e.g., one of background motion vectors 421, 422, 423 and 424 illustrated in FIG. 4), to a new position, namely, a position of a background BG of the third original frame F3 illustrated in FIG. 4. A foreground FG of the first original frame F1 moves, with a foreground motion vector (e.g., one of foreground motion vectors 431, 432 and 433 illustrated in FIG. 4), to a new position, namely, a position of a foreground FG of the second original frame F2 illustrated in FIG. 4. The foreground FG of the second original frame F2 illustrated in FIG. 4 moves, with a foreground motion vector (e.g., one of foreground motion vectors 441 and 442 illustrated in FIG. 4), to a new position, namely, a position of a foreground FG of the third original frame F3 illustrated in FIG. 4.

In the exemplary embodiment illustrated in FIG. 4, except for in an occlusion area 451, a similar block (which is a matched block) in the third original frame F3 may be found for any block of the second original frame F2, and except for in an occlusion area 452, a similar block (which is a matched block) in the first original frame F1 may be found for any block of the second original frame F2. The occlusion area 451 may be referred to as a covered area. The occlusion area 452 may be referred to as a de-covered area. The occlusion areas 451 and 452 illustrated in FIG. 4 may be derived with reference to the description related to the occlusion areas 131 and 132 illustrated in FIG. 1 and thus, will not be repeated.

With the use of the first motion vector of a current block among the blocks of the second original frame F2, the motion vector correction circuit 220 may start from the current block of the second original frame F2 to search for a first matched block among the blocks of the first original frame F1. With the use of the second motion vector of the first matched block of the first original frame F1, the motion vector correction circuit 220 may start from the current block of the second original frame F2 to search for a second matched block among the blocks of the first original frame F1. The motion vector correction circuit 220 may decide whether to use the second motion vector of the current block of the second original frame F2 to correct the first motion vector of the current block of the second original frame F2 based on the second motion vector of the first matched block and the second motion vector of the second matched block.

Taking a current block blk21 illustrated in FIG. 4 for example, it is assumed that the first motion vector of the current block blk21 of the second original frame F2 calculated by the motion vector generating circuit 210 in step S310 is a motion vector 461 illustrated in FIG. 4. Because no similar block in the first original frame F1 is found for the current block blk21 located in the occlusion area 452, the first motion vector 461 of the current block blk21 is usually unstable (incorrect). With the use of the first motion vector 461 of the current block blk21 of the second original frame F2, the motion vector correction circuit 220 may start from the current block blk21 of the second original frame F2 to search for a first matched block blk11 in the first original frame F1. A motion vector 414' illustrated in FIG. 4 may be obtained by moving the second motion vector 414 of the first matched block blk11 of the first original frame F1 in parallel. With the use of the motion vector 414', the motion vector correction circuit 220 may start from the current block blk21 of the second original frame F2 to search for a second matched block blk12 in the first original frame F1. Based on the second motion vector 414 of the first matched block blk11 and the second motion vector 433 of the second matched block blk12, the motion vector correction circuit 220 may decide whether to use the stable (correct) second motion vector 424 of the current block blk21 of the second original frame F2 to correct the unstable (incorrect) first motion vector 461 of the current block blk21 of the second original frame F2.

For instance (but not limited to), when a difference between the second motion vector 414 of the first matched block blk11 and the second motion vector 433 of the second matched block blk12 is greater than the first threshold TH1, the motion vector correction circuit 220 may determine that the current block blk21 of the second original frame F2 is located in the occlusion area 452. Otherwise, when the different between the motion vector 414 and the motion vector 433 is less than the first threshold TH1, the current block blk21 may be determined as not in the occlusion area. The first threshold TH1 may be decided according to a design demand. The "difference between the motion vector 414 and the motion vector 433" may be expressed by a formula, $|MV_{414}-MV_{433}|=|X_{414}-X_{433}|+|Y_{414}-Y_{433}|$, wherein $MV_{414}$ represents the motion vector 414, $MV_{433}$ represents the motion vector 433, $X_{414}$ represents a X-axial component of the motion vector 414, $Y_{414}$ represents a Y-axial component of the motion vector 414, $X_{433}$ represents an X-axial component of the motion vector 433, and $Y_{433}$ represents a Y-axial component of the motion vector 433. When $|MV_{414}-MV_{433}|>TH1$, the motion vector correction circuit 220 may determine that the current block blk21 of the second original frame F2 is located in a de-covered area (i.e., the occlusion area 452 illustrated in FIG. 4). When the difference between the second motion vector 414 of the first matched block blk11 and the second motion vector 433 of the second matched block blk12 is greater than the first threshold TH1, the motion vector correction circuit 220 may use the second motion vector 424 of the current block blk21 of the second original frame F2 to replace the first motion vector 461 of the current block blk21 of the second original frame F2.

In addition, with the use of the second motion vector of the current block of the second original frame F2, the motion vector correction circuit 220 may start from the current block of the second original frame F2 to search for a third matched block among the blocks of the third original frame F3. With the use of the first motion vector of the third matched block of the third original frame F3, the motion vector correction circuit 220 may start from the current block of the second original frame F2 to search for a fourth matched block among the blocks of the third original frame F3. According to the first motion vector of the third matched block and the first motion vector of the fourth matched block, the motion vector correction circuit 220 may decide whether to use the first motion vector of the current block of the second original frame F2 to correct the second motion vector of the current block of the second original frame F2.

Figure 5:
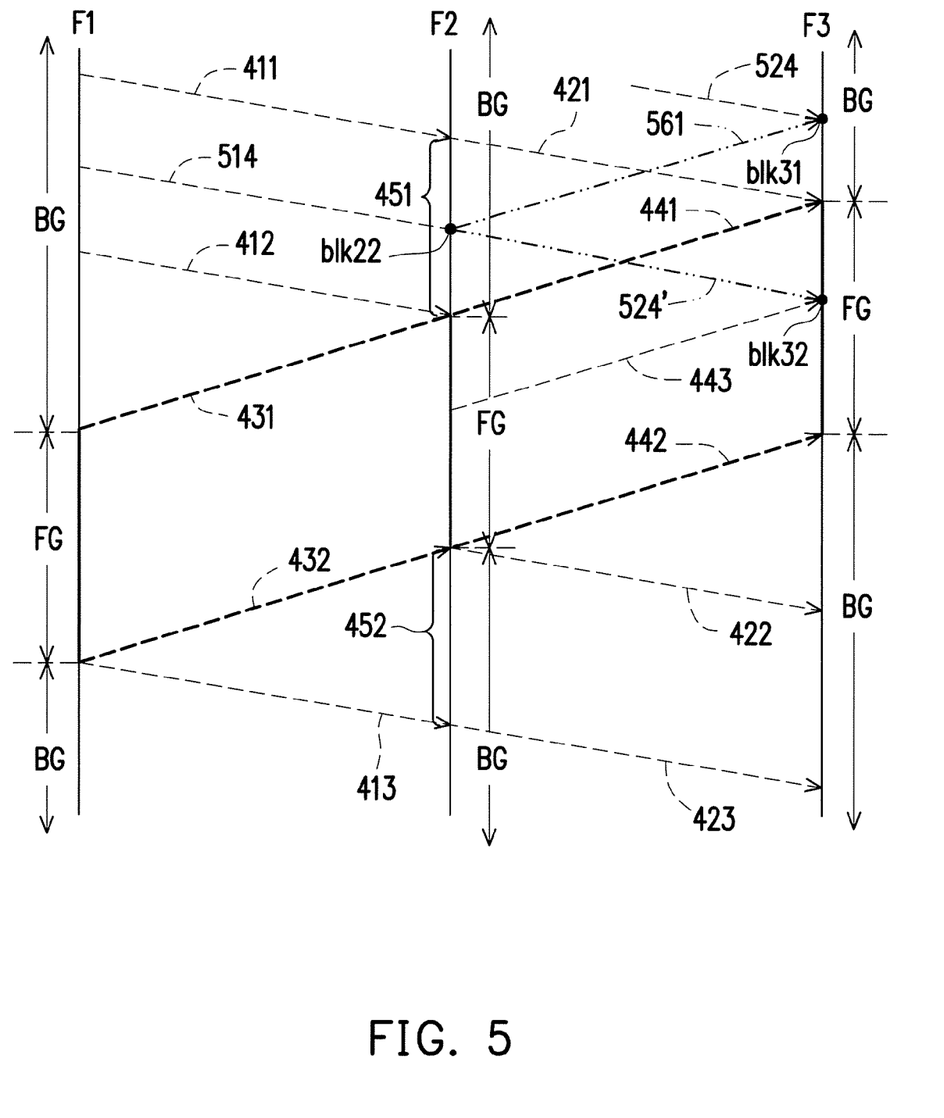
FIG. 5 is a schematic illustrating an operation scenario of step S320 depicted in FIG. 3 according to another embodiment of the invention.

FIG. 5 is a schematic illustrating an operation scenario of step S320 depicted in FIG. 3 according to another embodiment of the invention. The horizontal direction depicted in FIG. 5 may be used to represent time or a display sequence. The operation scenario depicted in FIG. 5 may be derived with reference to the description related to FIG. 4 and thus, will not be repeated. In the embodiment illustrated in FIG. 5, a background BG of the first original frame F1 moves, with a background motion vector (e.g., one of motion vectors 411, 412, 413 and 514 illustrated in FIG. 5), to a new position, namely, a position of a background BG of the second original frame F2 illustrated in FIG. 5. The background BG of the second original frame F2 illustrated in FIG. 5 moves, with a background motion vector (e.g., one of motion vectors 421, 422, 423 and 524 illustrated in FIG. 5), to a new position, namely, a position of a background BG of the third original frame F3 illustrated in FIG. 5. A foreground FG of the first original frame F1 moves, with a foreground motion vector (e.g., one of motion vectors 431 and 432 illustrated in FIG. 5), to a new position, namely, a position of a foreground FG of the second original frame F2 illustrated in FIG. 5. The foreground FG of the second original frame F2 illustrated in FIG. 5 moves, with a foreground motion vector (e.g., one of motion vectors 441, 442 and 443 illustrated in FIG. 5), to a new position, namely, a position of a foreground FG of the third original frame F3 illustrated in FIG. 5.

Refer to FIG. 2, FIG. 3 and FIG. 5. Taking a current block blk22 illustrated in FIG. 5 for example, it is assumed that the second motion vector of the current block blk22 of the second original frame F2 calculated by the motion vector generating circuit 210 in step S310 is a motion vector 561 illustrated in FIG. 5. Because no similar block in the third original frame F3 is found for the current block blk22 located in the occlusion area 451, the first motion vector 561 of the current block blk22 is usually unstable (incorrect). With the use of the second motion vector 561 of the current block blk22 of the second original frame F2, the motion vector correction circuit 220 may start from the current block blk22 of the second original frame F2 to search for a third matched block blk31 in the third original frame F3. A motion vector 524' illustrated in FIG. 5 may be obtained by moving the first motion vector 524 of the third matched block blk31 of the third original frame F3 in parallel. With the use of the motion vector 524', the motion vector correction circuit 220 may start from the current block blk22 of the second original frame F2 to search for a fourth matched block blk32 in the third original frame F3. Based on the first motion vector 524 of the third matched block blk31 and the first motion vector 443 of the fourth matched block blk32, the motion vector correction circuit 220 may decide whether to use the stable (correct) first motion vector 514 of the current block blk22 of the second original frame F2 to correct the unstable (incorrect) second motion vector 561 of the current block blk22 of the second original frame F2.

For instance (but not limited to), when a difference between the first motion vector 524 of the third matched block blk31 and the first motion vector 443 of the fourth matched block blk32 is greater than a second threshold TH2, the motion vector correction circuit 220 determines that the current block blk22 of the second original frame F2 is located in the occlusion area 451. Otherwise, when the difference between the motion vector 524 and the motion vector 443 is less than second threshold TH2, the current block blk22 may be determined as not in the occlusion area. The second threshold TH2 may be decided according to a design demand. The "difference between the motion vector 524 and the motion vector 443" may be expressed by a formula, $|MV_{524}-MV_{443}|=|X_{524}-X_{443}|+|Y_{524}-Y_{443}|$, wherein $MV_{524}$ represents the motion vector 524, $MV_{443}$ represents the motion vector 443, $X_{524}$ represents an X-axial component of the motion vector 524, $Y_{524}$ represents a Y-axial component of the motion vector 524, $X_{443}$ represents an X-axial component of the motion vector 443, and $Y_{443}$ represents a Y-axial component of the motion vector 443. When $|MV_{524}-MV_{443}|>TH2$, the motion vector correction circuit 220 may determine that the current block blk22 of the second original frame F2 is located in a covered area (i.e., the occlusion area 451 illustrated in FIG. 5). When the difference between the first motion vector 524 of the third matched block blk31 and the first motion vector 443 of the fourth matched block blk32 is greater than the second threshold TH2, the motion vector correction circuit 220 may use the first motion vector 514 of the current block blk22 of the second original frame F2 to replace the second motion vector 561 of the current block blk22 of the second original frame F2.

Refer to FIG. 2 and FIG. 3. The interpolation frame generating circuit 230 is coupled to the motion vector correction circuit 220 to receive the corrected motion vectors of the blocks of the first original frame F1 and the second original frame F2. In step S330, the interpolation frame generating circuit 230 may create at least one interpolation frame between the first original frame F1 and the second original frame F2 based on the corrected motion vectors. According to a design demand, the interpolation frame generating circuit 230 may create an interpolation frame (or a plurality of interpolation frames) between the first original frame F1 and the second original frame F2 by using any algorithm (e.g., a conventional de-halo algorithm, a conventional motion compensation (MC) algorithm, a conventional interpolation frame algorithm and/or any other algorithm for creating interpolation frames. After the creation of the interpolation frame is completed, the interpolation frame generating circuit 230 may output a video sequence VSout to a next stage circuit (not shown).

In light of the foregoing, in the present embodiment, the occlusion area 451 and/or the occlusion area 452 may be effectively detected by using the motion vectors of the first original frame F1, the second original frame F2 and the third original frame F3, so as to correct the motion vectors of the blocks in the occlusion area. Based on the stable (correct) corrected motion vectors, the interpolation frame generating circuit 230, in step S330, may de-halo and create the interpolation frame, thereby obtaining a more stable effect.

Figure 6:
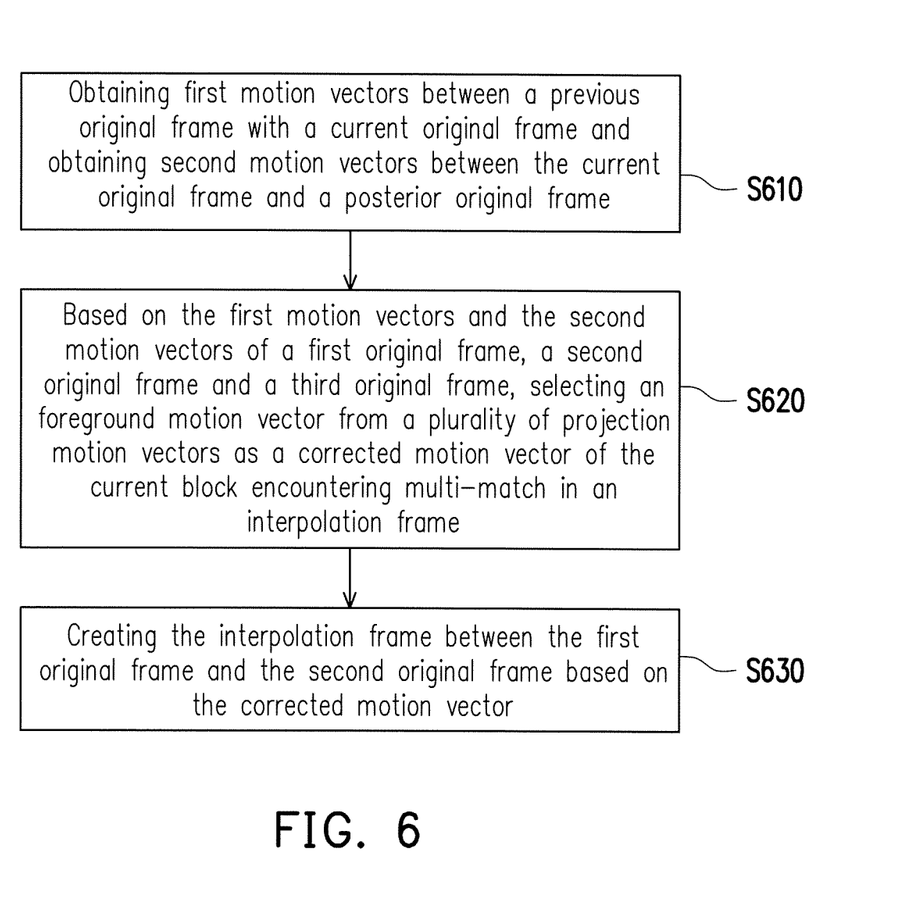
FIG. 6 is a flowchart illustrating an FRC method according to another embodiment of the invention.
Figure 7:
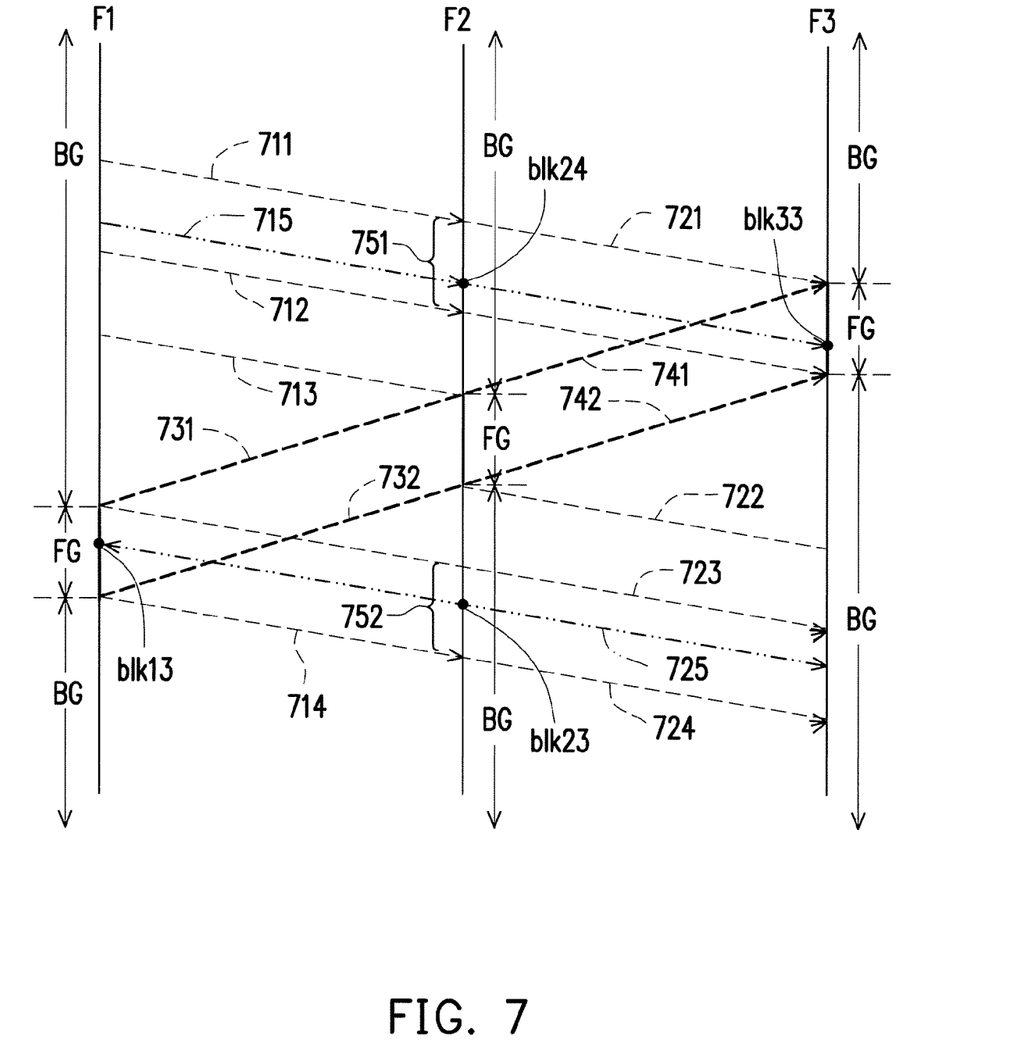
FIG. 7 is a schematic illustrating an operation scenario of step S620 depicted in FIG. 6 according to an embodiment of the invention.

FIG. 6 is a flowchart illustrating an FRC method according to another embodiment of the invention. Steps S610 and S630 illustrated in FIG. 6 may be derived with reference to the description related to steps S310 and S330 illustrated in FIG. 3 and thus, will not be repeated. FIG. 7 is a schematic illustrating an operation scenario of step S620 depicted in FIG. 6 according to an embodiment of the invention. The horizontal direction depicted in FIG. 7 may be used to represent time or a display sequence. In the embodiment illustrated in FIG. 7, a background BG of the first original frame F1 moves, with a background motion vector (e.g., one of motion vectors 711, 712, 713, 714 and 715 illustrated in FIG. 7), to a new position, namely, a position of a background BG of the second original frame F2 illustrated in FIG. 7. The background BG of the second original frame F2 illustrated in FIG. 7 moves, with a background motion vector (e.g., one of motion vectors 721, 722, 723, 724 and 725 illustrated in FIG. 7), to a new position, namely, a position of a background BG of the third original frame F3 illustrated in FIG. 7. A foreground FG of the first original frame F1 moves, with a foreground motion vector (e.g., one of motion vectors 731 and 732 illustrated in FIG. 7), to a new position, namely, a position of a foreground FG of the second original frame F2 illustrated in FIG. 7. The foreground FG of the second original frame F2 illustrated in FIG. 7 moves, with a foreground motion vector (e.g., one of motion vectors 741 and 742 illustrated in FIG. 7), to a new position, namely, a position of a foreground FG of the third original frame F3 illustrated in FIG. 7.

Figure 8:
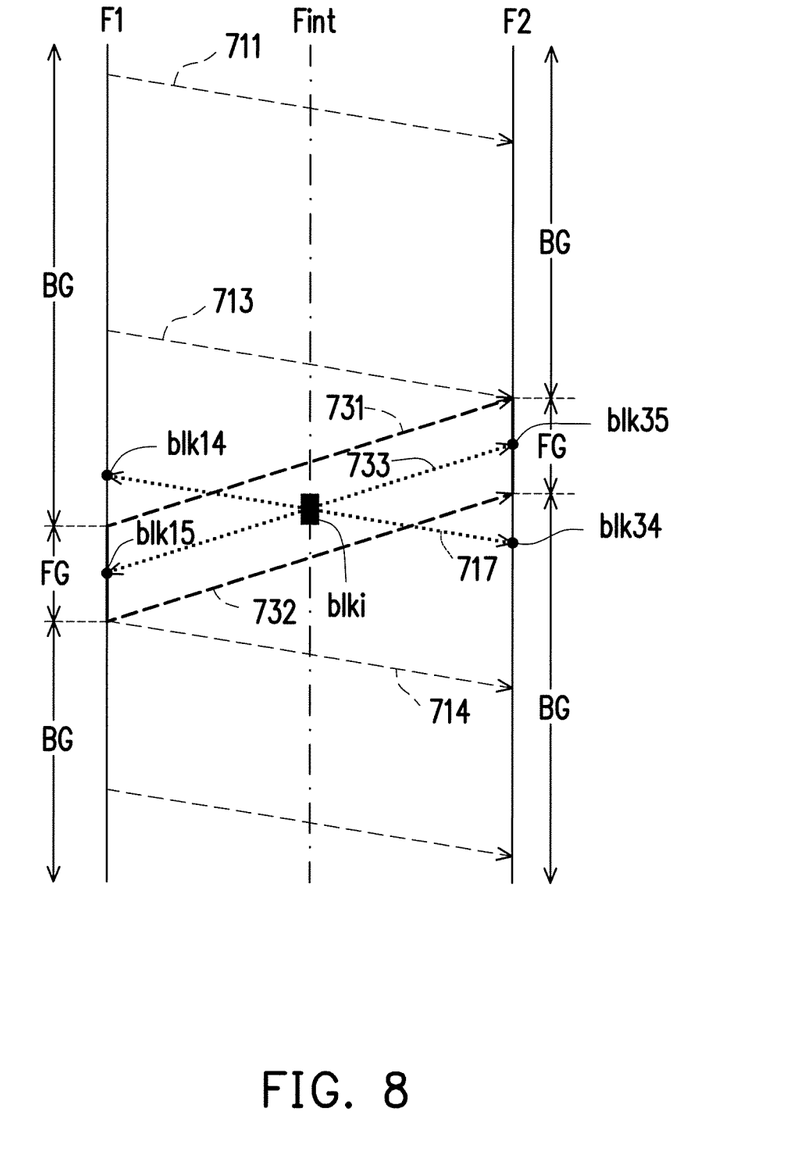
FIG. 8 is a schematic illustrating an operation scenario of performing a motion estimation operation on the first original frame and the second original frame depicted in FIG. 7 according to an embodiment of the invention.

Refer to FIG. 2, FIG. 6 and FIG. 7. The motion vector generating circuit 210, in step S610, may compare the first original frame F1 with the second original frame F2 to obtain the first motion vectors of the blocks of the second original frame F2. The motion vector generating circuit 210, in step S610, may further compare the second original frame F2 with the third original frame F3 to obtain the second motion vectors of the blocks of the second original frame F2. When a current block blki of an interpolation frame Fint (which will be specifically described below with reference to FIG. 8) between the first original frame F1 and the second original frame F2 encounters multi-match and has a plurality of projection motion vectors, the motion vector correction circuit 220, in step S620, may select a foreground block motion vector from the projection motion vectors as a corrected motion vector of the current block blki of the interpolation frame Fint (which will be specifically described below with reference to FIG. 8) based on the first motion vectors and the second motion vectors of the first original frame F1, the second original frame F2 and the third original frame F3. In step S630, the interpolation frame generating circuit 230 may create an interpolation frame Fint (or a plurality of interpolation frames) between the first original frame F1 and the second original frame F2 based on the corrected motion vectors, as illustrated in FIG. 8. After the creation of the interpolation frame is completed, the interpolation frame generating circuit 230 may output the video sequence VSout to a next stage circuit (not shown).

Specifically, the motion vector correction circuit 220, in step S620, may check whether the blocks of the second original frame F2 are located in the occlusion area based on the first motion vectors and the second motion vectors of the first original frame F1, the second original frame F2 and the third original frame F3. For instance, by deriving from the description related to the operation illustrated in FIG. 4, the motion vector correction circuit 220 may determine whether a current block in the second original frame F2 is located in a de-covered area 752 illustrated in FIG. 7. By deriving from the description related to the operation illustrated in FIG. 5, the motion vector correction circuit 220 may also determine whether the current block in the second original frame F2 is located in a covered area 751 illustrated in FIG. 7.

When the current block of the second original frame F2 is located in the de-covered area 752, the motion vector correction circuit 220, in step S620, may use the second motion vector of the current block of the second original frame F2 to start from the current block of the second original frame F2 to search for a first foreground block in the first original frame F1, so as to set a foreground flag to the first foreground block. For instance, it is assumed that a block blk23 of the second original frame F2 illustrated in FIG. 7 is the current block. By deriving from the description related to the operation illustrated in FIG. 4, the motion vector correction circuit 220, in step S620, may determine whether the current block blk23 in the second original frame F2 is located in the de-covered area 752 illustrated in FIG. 7. When the current block blk23 of the second original frame F2 is located in the de-covered area 752, the motion vector correction circuit 220, in step S620, may use the second motion vector 725 of the current block blk23 to start from the current block blk23 of the second original frame F2 to search for a first foreground block blk13 in the first original frame F1, so as to set a foreground flag to the first foreground block blk13. By analogy, all foreground blocks in the foreground FG of the first original frame F1 may be correctly set with the foreground flags. Information related to these "foreground flags" of the first original frame F1 may be applied to the interpolation frame Fint between the first original frame F1 and the second original frame F2 and/or another interpolation frame (not shown) between the first original frame F1 and a former original frame (not shown).

When the current block of the second original frame F2 is located in the covered area 751, the motion vector correction circuit 220, in step S620, may use the first motion vector of the current block of the second original frame F2 to start from the current block of the second original frame F2 to search for a second foreground block of the third original frame F3, so as to set a foreground flag to the second foreground block. For instance, it is assumed that a block blk24 of the second original frame F2 illustrated in FIG. 7 is the current block. By deriving from the description related to the operation illustrated in FIG. 5, the motion vector correction circuit 220, in step S620, may determine whether the current block blk24 in the second original frame F2 is located in the covered area 751 illustrated in FIG. 7. When the current block blk24 of the second original frame F2 is located in the covered area 751, the motion vector correction circuit 220, in step S620, may use the first motion vector 715 of the current block blk24 to start from the current block blk24 of the second original frame F2 to search for a second foreground block blk33 of the third original frame F3, so as to set a foreground flag to the second foreground block blk33. By analogy, all foreground blocks in the foreground FG of the third original frame F3 may be correctly set with the foreground flags. Information related to these "foreground flags" of the third original frame F3 may be applied to an interpolation frame (not shown) between the third original frame F3 and the second original frame F2 and/or another interpolation frame (not shown) between the third original frame F3 and a later original frame (not shown).

When a current block of the interpolation frame Fint between the first original frame F1 and the second original frame F2 encounters multi-match and has a plurality of projection motion vectors, the motion vector correction circuit 220, in step S620, may select a foreground block motion vector from the projection motion vectors as the corrected motion vector of the current block blki of the interpolation frame Fint according to the foreground flag. For instance, FIG. 8 is a schematic illustrating an operation scenario of performing a motion estimation operation on the first original frame F1 and the second original frame F2 depicted in FIG. 7 according to an embodiment of the invention. The horizontal direction depicted in FIG. 8 may be used to represent time or a display sequence. In the embodiment illustrated in FIG. 8, it is assumed that a plurality of best vectors (e.g., the projection motion vectors 717 and 733) are calculated for some blocks (e.g., the block blki) of the interpolation frame Fint according to the 3DRS algorithm, i.e., a multi-match issue occurs. If the projection motion vector 717 is mistakenly selected as the motion vector of the block blki, a data broken issue occurs to a foreground area in the interpolation frame Fint after the creation of the interpolation frame Fint is completed.

By deriving from the description related to FIG. 7, the "foreground flag" information related to difference frames may be obtained in different frame processing periods. Thus, when all the foreground blocks in the foreground FG of the first original frame F1 are correctly set with the foreground flags, all the foreground blocks in the foreground FG of the second original frame F2 are also correctly set with the foreground flags. When the current block blki of the interpolation frame Fint encounters the multi-match and has the projection motion vectors (in this case, both the projection motion vectors 717 and 733 are the best vectors of the current block blki), the motion vector correction circuit 220, in step S620, may check whether the blocks pointed by the projection motion vectors 717 and 733 are set with the foreground flags. When two blocks in the first original frame F1 and the second original frame F2 pointed by a specific vector among the projection motion vectors are both set with the foreground flags, the motion vector correction circuit 220 may select the specific vector as the foreground block motion vector. For instance, both blocks blk14 and blk34 pointed by the projection motion vector 717 are not set with the foreground flags, but both blocks blk15 and blk35 pointed by the projection motion vector 733 are set with the foreground flags. According to the foreground flags of the blocks blk15 and blk35, the motion vector correction circuit 220 may confirm that the projection motion vector 733 is a foreground block motion vector. Thus, the motion vector correction circuit 220, in step S620, may select the projection motion vector 733 as the corrected motion vector of the current block blki of the interpolation frame Fint. Thereby, the data broken issue occurring to the foreground area of the interpolation frame Fint may be effectively improved.

Figure 9:
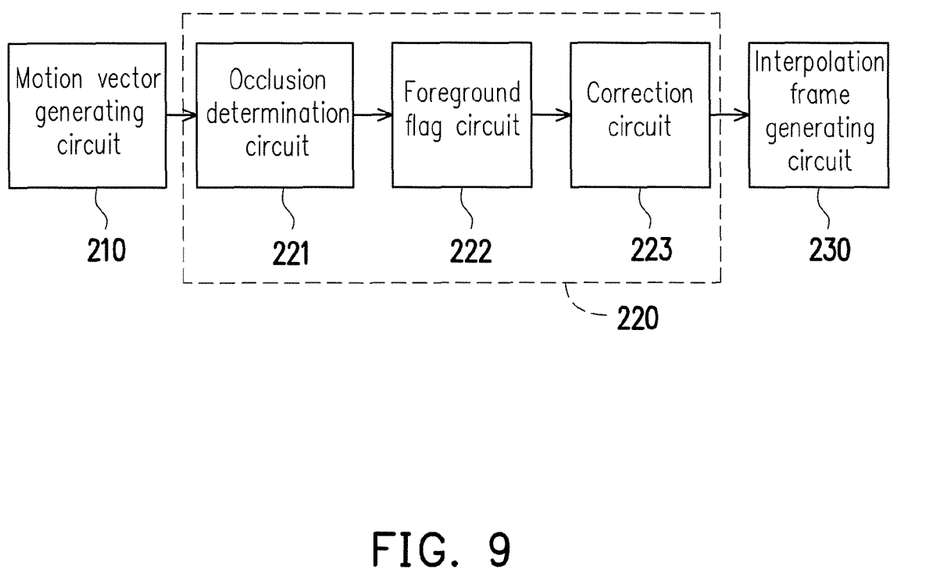
FIG. 9 is a schematic circuit block diagram illustrating the motion vector correction circuit depicted in FIG. 2 according to an embodiment of the invention.

FIG. 9 is a schematic circuit block diagram illustrating the motion vector correction circuit 220 depicted in FIG. 2 according to an embodiment of the invention. In the embodiment illustrated in FIG. 9, the motion vector correction circuit 220 includes an occlusion determination circuit 221, a foreground flag circuit 222 and a correction circuit 223. According to a design demand, in some other embodiments, the occlusion determination circuit 221, the foreground flag circuit 222 and/or the correction circuit 223 may be implemented in a form of firmware or software. For example, related functions of the occlusion determination circuit 221, the foreground flag circuit 222 and/or the correction circuit 223 may be implemented by firmware codes (or software codes). The firmware codes (or software codes) may be stored in a memory and operated by a processor, a microcontroller or any other computation platform.

The occlusion determination circuit 221 is coupled to the motion vector generating circuit 210 to receive the first motion vectors and the second motion vectors of the first original frame F1, the second original frame F2 and the third original frame F3. The occlusion determination circuit 221 may perform the related operation illustrated in FIG. 4, so as to decide whether the current block of the second original frame F2 is located in the de-covered area. The occlusion determination circuit 221 may also perform the related operation illustrated in FIG. 5, so as to decide whether the current block of the second original frame F2 is located in the covered area. Taking FIG. 7 for example, the occlusion determination circuit 221 may decide whether the current block of the second original frame F2 is located in the covered area 751 or in the de-covered area 752.

The foreground flag circuit 222 is coupled to the occlusion determination circuit 221 to receive the determination result. When the current block of the second original frame F2 is located in the de-covered area 752, the foreground flag circuit 222 may use the second motion vector of the current block of the second original frame F2 to start from the current block of the second original frame F2 to search for a first foreground block of the first original frame F1 and set a foreground flag to the first foreground block. For instance, it is assumed that the block blk23 of the second original frame F2 illustrated in FIG. 7 is the current block. Because the block blk23 is located in the de-covered area 752, the foreground flag circuit 222 may use the second motion vector 725 of the block blk23 to start from the block blk23 of the second original frame F2 to search for the first foreground block blk13 in the first original frame F1 and set a foreground flag to the first foreground block blk13. By analogy, the foreground flag circuit 222 may correctly set the foreground flag to all the foreground blocks in the foreground FG of the first original frame F1.

When the current block of the second original frame F2 is located in the covered area 751, the foreground flag circuit 222 may use the first motion vector of the current block of the second original frame F2 to start from the current block of the second original frame F2 to search for a second foreground block of the third original frame F3 and set a foreground flag to the second foreground block. For instance, it is assumed that the block blk24 of the second original frame F2 illustrated in FIG. 7 is the current block.

Because the block blk24 is located in the covered area 751, the foreground flag circuit 222 may use the first motion vector 715 of the block blk24 to start from the block blk24 of the second original frame F2 to search for the second foreground block blk33 of the third original frame F3 and set a foreground flag to the second foreground block blk33. By analogy, the foreground flag circuit 222 may correctly set the foreground flag to all the foreground blocks in the foreground FG of the third original frame F3.

The correction circuit 223 is coupled to foreground flag circuit 222 to receive information related to the foreground flag. When the current block of the interpolation frame Fint between the first original frame F1 and the second original frame F2 encounters multi-match and has a plurality of projection motion vectors, the correction circuit 223 may select a foreground block motion vector from the projection motion vectors as a corrected motion vector of the current block of the interpolation frame Fint according to the foreground flag. Then, the correction circuit 223 provides the corrected motion vector to the interpolation frame generating circuit 230 to create the interpolation frame Fint. Namely, when two blocks in the first original frame F1 and the second original frame F2 pointed by a specific vector among the projection motion vectors are both set with the foreground flag, the correction circuit 223 may select the specific vector as the foreground block motion vector.

For instance, it is assumed that the block blki of the interpolation frame Fint illustrated in FIG. 8 is the current block. The current block blki encounters multi-match, i.e., the current block blki has a plurality of best vectors (i.e., the projection motion vectors 717 and 733). Because both the blocks blk15 and blk35 pointed by the projection motion vector 733 are set with the foreground flag, the correction circuit 223 may select the projection motion vector 733 as a corrected motion vector of the current block blki of the interpolation frame Fint. Then, the correction circuit 223 provides the corrected motion vectors 733 to the interpolation frame generating circuit 230 to create the block blki of the interpolation frame Fint. Thus, the FRC method and device of the present embodiment may effectively improve the issue of multi-match.

It should be noted that in various application scenarios, related functions of the FRC apparatus 200, the motion vector generating circuit 210, the motion vector correction circuit 220, the occlusion determination circuit 221, the foreground flag circuit 222, the correction circuit 223 and/or the interpolation frame generating circuit 230 may be implemented in a form of software, firmware or hardware by employing general programming languages (e.g., C or C++), hardware description languages (e.g., Verilog HDL or VHDL) or other suitable programming languages. The programming languages capable of executing the related functions may be deployed in any computer-accessible media, such as magnetic tapes, semiconductor memories, magnetic disks or compact disks (e.g., CD-ROM or DVD-ROM) or may be delivered through the Internet, wired communication, wireless communication or other communication media. The programming languages may be stored in the computer-accessible media for a processor of the computer to access/execute the programming codes of the software (or firmware). In terms of hardware implementation, by being combined with the aspects disclosed by the embodiments described herein, the functions described herein may be implemented or executed by various exemplary logics, logic blocks, modules and circuits in one or more controllers, microcontrollers, microprocessors, application-specific integrated circuits (ASIC), digital signal processors (DSPs), field programmable gate arrays (FPGAs) and/or other processing units. Moreover, the apparatus and the method of the invention may be implemented by means of a combination of hardware and software.

To summarize, the FRC apparatus and method provided by the embodiments of the invention, the occlusion area and/or the occlusion area can be effectively detected based on the motion vectors of the first original frame, the second original frame and the third original frame to correct the motion vectors of the blocks in the occlusion area. Based on the stable (correct) corrected motion vector, the interpolation frame generating circuit can de-halo and create the interpolation frame, thereby obtaining a more stable effect. In some other embodiments, based on the determined occlusion areas, the FRC apparatus can correctly set the foreground flag to all the foreground blocks in the foreground FG of each original frame. According to the foreground flag, the FRC apparatus can select a foreground block motion vector from a plurality of best vectors of the current block encountering the multi-match as the corrected motion vector of the current block of the interpolation frame. Thereby, the issue of multi-match can be effectively improved.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A frame rate up-conversion (FRC) apparatus, comprising:
   a motion vector generating circuit, configured to compare a previous original frame with a current original frame to obtain first motion vectors of a plurality of blocks of the current original frame and compare the current original frame with a posterior original frame to obtain second motion vectors of the blocks of the current original frame;
   a motion vector correction circuit, coupled to the motion vector generating circuit to receive the first motion vectors and the second motion vectors of a first original frame, a second original frame and a third original frame, and configured to check whether the blocks of the second original frame are located in an occlusion area and correct the motion vectors of the blocks in the occlusion area based on the first motion vectors and the second motion vectors of the first original frame, the second original frame and the third original frame; and
   an interpolation frame generating circuit, coupled to the motion vector correction circuit to receive the corrected motion vectors of the blocks of the first original frame and the second original frame, and configured to create at least one interpolation frame between the first original frame and the second original frame based on the corrected motion vectors.

2. The FRC apparatus according to claim 1, wherein
   the motion vector correction circuit starts from a current block among the blocks of the second original frame to search for a first matched block among the blocks of the first original frame by using the first motion vector of the current block of the second original frame,
   the motion vector correction circuit starts from the current block of the second original frame to search for a second matched block among the blocks of the first original frame by using the second motion vector of the first matched block of the first original frame, the motion vector correction circuit starts form the current block of the second original frame to search for a third matched block among the blocks of the third original frame by using the second motion vector of the current block of the second original frame, the motion vector correction circuit starts from the current block of the second original frame to search for a fourth matched block among the blocks of the third original frame by using the first motion vector of the third matched block of the third original frame, the motion vector correction circuit determines whether to correct the first motion vector of the current block of the second original frame by using the second motion vector of the current block of the second original frame based on the second motion vector of the first matched block and the second motion vector of the second matched block, and the motion vector correction circuit determines whether to correct the second motion vector of the current block of the second original frame by using the first motion vector of the current block of the second original frame based on the first motion vector of the third matched block and the first motion vector of the fourth matched block.

3. The FRC apparatus according to claim 2, wherein when a difference between the second motion vector of the first matched block and the second motion vector of the second matched block is greater than a first threshold, the motion vector correction circuit determines that the current block of the second original frame is located in the occlusion area, and when a difference between the first motion vector of the third matched block and the first motion vector of the fourth matched block is greater than a second threshold, the motion vector correction circuit determines that the current block of the second original frame is located in the occlusion area.

4. The FRC apparatus according to claim 3, wherein when the difference between the second motion vector of the first matched block and the second motion vector of the second matched block is greater than the first threshold, the motion vector correction circuit uses the second motion vector of the current block of the second original frame to replace the first motion vector of the current block of the second original frame, and when the difference between the first motion vector of the third matched block and the first motion vector of the fourth matched block is greater than the second threshold, the motion vector correction circuit uses the first motion vector of the current block of the second original frame to replace the second motion vector of the current block of the second original frame.

5. The FRC apparatus according to claim 2, wherein the motion vector correction circuit comprises an occlusion determination circuit, coupled to the motion vector generating circuit to receive the first motion vectors and the second motion vectors of the first original frame, the second original frame and the third original frame, and configured to decide whether the current block of the second original frame is located in a de-covered area based on the second motion vector of the first matched block and the second motion vector of the second matched block and decide whether the current block of the second original frame is located in a covered area based on the first motion vector of the third matched block and the first motion vector of the fourth matched block;

a foreground flag circuit, coupled to the occlusion determination circuit to receive a determination result, wherein the foreground flag circuit starts from the current block of the second original frame to search for a first foreground block among the blocks of the first original frame by using the second motion vector of the current block of the second original frame and set a foreground flag to the first foreground block when the current block of the second original frame is located in the de-covered area, and the foreground flag circuit starts form the current block of the second original frame to search for a second foreground block among the blocks of third original frame by using the first motion vector of the current block of the second original frame and set a foreground flag to the second foreground block when the current block of the second original frame is located in the covered area; and a correction circuit, coupled to the foreground flag circuit to receive the foreground flag, wherein when the current block of an interpolation frame between the first original frame and the second original frame encounters multi-match and has a plurality of projection motion vectors, the correction circuit selects a foreground block motion vector from the projection motion vectors as a corrected motion vector of the current block of the interpolation frame according to the foreground flag and provides the corrected motion vector to the interpolation frame generating circuit to create the interpolation frame.

6. The FRC apparatus according to claim 5, wherein when a difference between the second motion vector of the first matched block and the second motion vector of the second matched block is greater than a first threshold, the occlusion determination circuit determines that the current block of the second original frame is located in the de-covered area, and when a difference between the first motion vector of the third matched block and the first motion vector of the fourth matched block is greater than a second threshold, the occlusion determination circuit determines that the current block of the second original frame is located in the covered area.

7. The FRC apparatus according to claim 5, wherein when two blocks in the first original frame and the second original frame pointed by a specific vector among the projection motion vectors are both set with the foreground flag, the correction circuit selects the specific vector as the foreground block motion vector.

8. A frame rate up-conversion (FRC) method, comprising:
comparing a previous original frame with a current original frame to obtain first motion vectors of a plurality of blocks of the current original frame;
comparing the current original frame with a posterior original frame to obtain second motion vectors of the blocks of the current original frame;
based on the first motion vectors and the second motion vectors of a first original frame, a second original frame and a third original frame, checking whether the blocks of the second original frame are located in an occlusion area and correcting the motion vectors of the blocks in the occlusion area to obtain corrected motion vectors of the blocks of the first original frame and the second original frame; and
creating at least one interpolation frame between the first original frame and the second original frame based on the corrected motion vectors.

9. The FRC method according to claim 8, wherein the step of checking whether the blocks of the second original frame are located in the occlusion area and correcting the motion vectors of the blocks in the occlusion area comprises:
using the first motion vector of a current block among the blocks of the second original frame to start from the current block of the second original frame to search for a first matched block among the blocks of the first original frame;
using the second motion vector of the first matched block of the first original frame to start from the current block of the second original frame to search for a second matched block among the blocks of the first original frame;
using the second motion vector of the current block of the second original frame to start from the current block of the second original frame to search for a third matched block among the blocks of the third original frame;
using the first motion vector of the third matched block of the third original frame to start from the current block of the second original frame to search for a fourth matched block among the blocks of the third original frame;
deciding whether to correct the first motion vector of the current block of the second original frame by using the second motion vector of the current block of the second original frame based on the second motion vector of the first matched block and the second motion vector of the second matched block; and
deciding whether to correct the second motion vector of the current block of the second original frame by using the first motion vector of the current block of the second original frame based on the first motion vector of the third matched block and the first motion vector of the fourth matched block.

10. The FRC method according to claim 9, wherein the step of checking whether the blocks of the second original frame are located in the occlusion area comprises:
when a difference between the second motion vector of the first matched block and the second motion vector of the second matched block is greater than a first threshold, determining that the current block of the second original frame is located in the occlusion area; and
when a difference between the first motion vector of the third matched block and the first motion vector of the fourth matched block is greater than a second threshold, determining that the current block of the second original frame is located in the occlusion area.

11. The FRC method according to claim 10, wherein the step of correcting the motion vectors of the blocks in the occlusion area comprises:
when the difference between the second motion vector of the first matched block and the second motion vector of the second matched block is greater than the first threshold, using the second motion vector of the current block of the second original frame to replace the first motion vector of the current block of the second original frame; and
when the difference between the first motion vector of the third matched block and the first motion vector of the fourth matched block is greater than the second threshold, using the first motion vector of the current block of the second original frame to replace the second motion vector of the current block of the second original frame.

12. The FRC method according to claim 9, wherein the step of checking whether the blocks of the second original frame are located in the occlusion area comprises:
deciding whether the current block of the second original frame is located in a de-covered area based on the second motion vector of the first matched block and the second motion vector of the second matched block; and
deciding whether the current block of the second original frame is located in a covered area based on the first motion vector of the third matched block and the first motion vector of the fourth matched block.

13. The FRC method according to claim 12, further comprising:
when the difference between the second motion vector of the first matched block and the second motion vector of the second matched block is greater than a first threshold, determining that the current block of the second original frame is located in the de-covered area; and
when the difference between the first motion vector of the third matched block and the first motion vector of the fourth matched block is greater than a second threshold, determining that the current block of the second original frame is located in the covered area.

14. The FRC method according to claim 12, wherein the step of correcting the motion vectors of the blocks in the occlusion area comprises:
when the current block of the second original frame is located in the de-covered area, using the second motion vector of the current block of the second original frame to start form the current block of the second original frame to search for a first foreground block among the blocks of the first original frame, so as to set a foreground flag to the first foreground block;
when the current block of the second original frame is located in the covered area, using the first motion vector of the current block of the second original frame to start form the current block of the second original frame to search for a second foreground block among the blocks of third original frame, so as to set a foreground flag to the second foreground block; and
when the current block of an interpolation frame between the first original frame and the second original frame encounters multi-match and has a plurality of projection motion vectors, selecting a foreground block motion vector from the projection motion vectors according to the foreground flag as a corrected motion vector of the current block of the interpolation frame.

15. The FRC method according to claim 14, wherein when two blocks in the first original frame and the second original frame pointed by a specific vector among the projection motion vectors are both set with the foreground flag, selecting the specific vector as the foreground block motion vector.

16. A frame rate up-conversion (FRC) apparatus, comprising:
a motion vector generating circuit, configured to compare a previous original frame with a current original frame to obtain first motion vectors of a plurality of blocks of the current original frame and compare the current original frame with a posterior original frame to obtain second motion vectors of the blocks of the current original frame;
a motion vector correction circuit, coupled to the motion vector generating circuit to receive the first motion vectors and the second motion vectors of a first original frame, a second original frame and a third original frame, wherein when a current block of an interpolation frame between the first original frame and the second original frame encounters multi-match and has a plurality of projection motion vectors, the motion vector correction circuit selects a foreground block motion vector from the projection motion vectors as a corrected motion vector of the current block of the interpolation frame based on the first motion vectors and the second motion vectors of the first original frame, the second original frame and the third original frame; and an interpolation frame generating circuit, coupled to the motion vector correction circuit to receive the corrected motion vectors of the blocks of the interpolation frame, and configured to create the interpolation frame between the first original frame and the second original frame based on the corrected motion vectors.

17. The FRC apparatus according to claim 16, wherein
the motion vector correction circuit starts from a current block among the blocks of the second original frame to search for a first matched block among the blocks of the first original frame by using the first motion vector of the current block of the second original frame, the motion vector correction circuit starts from the current block of the second original frame to search for a second matched block among the blocks of the first original frame by using a second motion vector of the first matched block of the first original frame, the motion vector correction circuit starts from the current block of the second original frame to search for a third matched block among the blocks of the third original frame by using the second motion vector of the current block of the second original frame, the motion vector correction circuit starts from the current block of the second original frame to search for a fourth matched block among the blocks of the third original frame by using the first motion vector of the third matched block of the third original frame, the motion vector correction circuit determines whether the current block of the second original frame is located in a de-covered area based on the second motion vector of the first matched block and the second motion vector of the second matched block, and the motion vector correction circuit determines whether the current block of the second original frame is located in a covered area based on the first motion vector of the third matched block and the first motion vector of the fourth matched block.

18. The FRC apparatus according to claim 17, wherein the motion vector correction circuit comprises:

an occlusion determination circuit, coupled to the motion vector generating circuit to receive the first motion vectors and the second motion vectors of the first original frame, the second original frame and the third original frame, and configured to decide whether the current block of the second original frame is located in the de-covered area based on the second motion vector of the first matched block and the second motion vector of the second matched block and decide whether the current block of the second original frame is located in the covered area based on the first motion vector of the third matched block and the first motion vector of the fourth matched block;

a foreground flag circuit, coupled to the occlusion determination circuit to receive a determination result, wherein the foreground flag circuit starts from the current block of the second original frame to search for a first foreground block among the blocks of the first original frame by using the second motion vector of the current block of the second original frame and set a foreground flag to the first foreground block when the current block of the second original frame is located in the de-covered area, and the foreground flag circuit starts from the current block of the second original frame to search for a second foreground block among the blocks of third original frame by using the first motion vector of the current block of the second original frame and set a foreground flag to the second foreground block when the current block of the second original frame is located in the covered area; and a correction circuit, coupled to the foreground flag circuit to receive the foreground flag, wherein when the current block of the interpolation frame between the first original frame and the second original frame encounters the multi-match and has the projection motion vectors, the correction circuit selects the foreground block motion vector from the projection motion vectors as the corrected motion vector of the current block of the interpolation frame according to the foreground flag and provides the corrected motion vector to the interpolation frame generating circuit to create the interpolation frame.

19. The FRC apparatus according to claim 18, wherein when a difference between the second motion vector of the first matched block and the second motion vector of the second matched block is greater than a first threshold, the occlusion determination circuit determines that the current block of the second original frame is located in the de-covered area, and when a difference between the first motion vector of the third matched block and the first motion vector of the fourth matched block is greater than a second threshold, the occlusion determination circuit determines that the current block of the second original frame is located in the covered area.

20. The FRC apparatus according to claim 18, wherein when two blocks in the first original frame and the second original frame pointed by a specific vector among the projection motion vectors are both set with the foreground flag, the correction circuit selects the specific vector as the foreground block motion vector.

21. A frame rate up-conversion (FRC) method, comprising:

comparing a previous original frame with a current original frame to obtain first motion vectors of a plurality of blocks of the current original frame;

comparing the current original frame with a posterior original frame to obtain second motion vectors of the blocks of the current original frame;

based on the first motion vectors and the second motion vectors of a first original frame, a second original frame and a third original frame, when a current block of an interpolation frame between the first original frame and the second original frame encounters multi-match and has a plurality of projection motion vectors, selecting a foreground block motion vector from the projection motion vectors as a corrected motion vector of the current block of the interpolation frame to obtain corrected motion vectors of the blocks of the interpolation frame; and creating the interpolation frame between the first original frame and the second original frame based on the corrected motion vectors.

22. The FRC method according to claim 21, wherein the step of selecting the foreground block motion vector from the projection motion vectors comprises:

using the first motion vector of a current block among the blocks of the second original frame to start from the current block of the second original frame to search for a first matched block among the blocks of the first original frame;

using the second motion vector of the first matched block of the first original frame to start from the current block of the second original frame to search for a second matched block among the blocks of the first original frame;

using the second motion vector of the current block of the second original frame to start from the current block of the second original frame to search for a third matched block among the blocks of the third original frame;

using the first motion vector of the third matched block of the third original frame to start from the current block of the second original frame to search for a fourth matched block among the blocks of the third original frame;

determining whether the current block of the second original frame is located in a de-covered area based on the second motion vector of the first matched block and the second motion vector of the second matched block; and determining whether the current block of the second original frame is located in a covered area based on the first motion vector of the third matched block and the first motion vector of the fourth matched block.

23. The FRC method according to claim 22, further comprising:

when a difference between the second motion vector of the first matched block and the second motion vector of the second matched block is greater than a first threshold, determining that the current block of the second original frame is located in the de-covered area; and when a difference between the first motion vector of the third matched block and the first motion vector of the fourth matched block is greater than a second threshold, determining that the current block of the second original frame is located in the covered area.

24. The FRC method according to claim 22, wherein the step of selecting the foreground block motion vector from the projection motion vectors further comprises:

when the current block of the second original frame is located in the de-covered area, using the second motion vector of the current block of the second original frame to start from the current block of the second original frame to search for a first foreground block among the blocks of the first original frame, so as to set a foreground flag to the first foreground block;

when the current block of the second original frame is located in the covered area, using the first motion vector of the current block of the second original frame to start from the current block of the second original frame to search for a second foreground block among the blocks of third original frame, so as to set a foreground flag to the second foreground block; and when the current block of the interpolation frame between the first original frame and the second original frame encounters the multi-match and has the projection motion vectors, selecting the foreground block motion vector from the projection motion vectors as the corrected motion vector of the current block of the interpolation frame according to the foreground flag.

25. The FRC method according to claim 24, wherein when two blocks in the first original frame and the second original frame pointed by a specific vector among the projection motion vectors are both set with the foreground flag, selecting the specific vector as the foreground block motion vector.

* * * * *